United States Patent [19]

Mitchell

[11] 4,402,123

[45] Sep. 6, 1983

[54] PROCESS AND APPARATUS FOR REMOVING BASE CUPS FROM PLASTIC BOTTLES

[76] Inventor: Harry J. Mitchell, 313 N. Belleview Ave., Langhorne, Pa. 19047

[21] Appl. No.: 301,990

[22] Filed: Sep. 14, 1981

[51] Int. Cl.³ .......................... B23P 19/00; B26F 3/00
[52] U.S. Cl. ................................. 29/426.2; 29/426.5; 225/97
[58] Field of Search ...................... 29/426.5, 773, 801, 29/426.2; 225/103, 97; 198/626, 627, 628

[56] References Cited

U.S. PATENT DOCUMENTS 3,802,549  4/1974  Kinsey ................................. 198/627
4,064,987  12/1977  Rowan ................................. 198/628
4,316,411  2/1982  Keaton ................................. 198/626

Primary Examiner—Ervin M. Combs
Assistant Examiner—Steven E. Nichols
Attorney, Agent, or Firm—Robert S. Bramson

[57] ABSTRACT

A machine and process for removing adhesively fastened base cups from plastic bottles, comprising conveyor means for transporting said bottles and a pair of inwardly opposed extensible fingers, projecting at an angle of about 25° to about 30° upward from the vertical, to engage each base cup and separate it from the bottle. Optionally, the machine may include means to cut the bottle into sections for more remunerative scrap recovery.

10 Claims, 5 Drawing Figures

PROCESS AND APPARATUS FOR REMOVING BASE CUPS FROM PLASTIC BOTTLES

BACKGROUND OF THE INVENTION (a) Field of the Invention

The invention relates to the field of blow molded plastic bottles of the type commonly used to contain soda, each containing a separate base element.

(b) Prior Art

Plastic bottles, of the kind in which carbonated beverages are commonly sold, are being used with increasing frequency. The plastic containers are used in lieu of glass containers. The plastic containers are typically, but not necessarily, formed of a blow molded polyester bottle, which has a rounded bottom and is therefore unstable for storage purposes. The rounded bottom is necessary in order to be able to achieve efficient manufacture of structurally satisfactory plastic bottles, so that it is necessary to stabilize the bottle, so that it can easily be stored in upright position, with a separate base element which has a flat bottom and is typically adhesively glued to the bottom of the bottle element.

It frequently occurs that a bottle is not satisfactory for filling, because it does not pass the applicable quality control tests. Some reasons why bottles are not usable are that they leak (in the manufacturing process, they are checked with a leak detector), the labeling machine has not applied or has misapplied the label, the bottle neck is not formed properly or the bottle is mounted in the base cup at a crooked angle. If any of these situations occur, the bottle is rejected and will not be reused.

For economic reasons, it is desirable to be able to recycle the unused bottle to recover the plastic for its scrap value.

Various machines have been attempted to be made for automatically removing the base cup from the bottle, but to the best of applicant's knowledge, none of these has been successful. Therefore, in many, if not most, bottle factories, the base cap is removed from the bottle by hand, with the operator digging his or her fingers in the space between the upper edge of the base cup and the bottle and simply pulling the base cup off, shearing the adhesive glue spots which fasten the bottle to the base cup. This is a very tedious and difficult task for the average factory worker; it is not desirable work and is slow and expensive to achieve. Furthermore, when the base cup is finally removed manually, the bottle itself is often wholly or partially crushed and is therefore not easy to cut into sections. It is desirable to cut the bottle into sections, since the resin which is not contaminated with glue spots or a label is more valuable and more easily reused than the resin which is contaminated with a label or glue spots. However, the crushed bottle is very difficult to cut automatically and rapidly into sections, and therefore another problem in a plastic bottle factory is the problem of developing an adequate cutting mechanism for cutting various sections from the bottle.

BRIEF SUMMARY OF THE INVENTION

The invention is directed to a process and apparatus for automatically and efficiently removing the base cups from plastic bottles, and, if desired, cutting the plastic bottle into sections for separately recycling the virgin material and plastic which has been contaminated by having a label adhered thereto or glue spots for securing of the base cup.

These results are achieved in an economical and efficient manner with a machine which is relatively inexpensive to manufacture and which comprises a conveyor mechanism with two opposed conveyor belts having parallel, vertically extending faces, between which the bottles pass to have their bases removed. The material and spacing of the conveyor mechanism is important to the practice of the invention to provide adequate engagement of the bottles to withstand the forces of separation of the base cup from the bottle without crushing the bottle, so that the bottle can exit the separating mechanism in substantially the same undeformed shape as it enters.

The operative mechanism for removing the base cup from the bottle constitutes a pair of downwardly and inwardly extending fingers in opposition to each other, and desirably pneumatically operated. The fingers are structured to engage the bottle side at the upper edge of the base cup at an angle of about 25° to about 30° inward from the vertical, and the downward displacement of the pneumatically actuated fingers is sufficient to shear the base cup from the base of the bottle quickly and effectively, using air pressure of from about 40 to about 100 p.s.i. to operate each cylinder without permanently distorting the bottle, so that the bottle can be discharged from the machine in substantially its original shape. This is important to facilitate subsequent cutting of the bottle into sections for recycling.

The removed base cup then drops through the floor of the machine into a suitable collective receptacle.

At the exit end of the machine there may be one or more horizontal band saws or other cutting means into which the bottles then pass. The band saws have horizontal blades and are vertically adjustable so that the bottles can be severed at different places along their vertical axes, depending upon what portion of the bottle has been contaminated with foreign material.

The conveyors are adjustably mounted, as are the pneumatic cylinders which actuate the base cup removing fingers, so that the machine may easily be adjusted to accommodate different sizes of bottles, for example the one liter and two liter bottles which are now commonly used.

OBJECTS OF THE INVENTION

It is therefore an object of this invention to provide an automatic, efficient and economical machine for rapidly removing base cups from plastic bottles with minimum operator time and effort and without substantially deforming the bottles.

It is a further object of this invention to provide a process and apparatus for efficiently, economically and rapidly removing base cups from bottles, and then cutting the bottles into sections for reclamation of their plastic constituents.

Yet another object of this invention is to provide an apparatus for separating base cups from plastic soda bottles and cutting the soda bottles for reclamation of their constituent plastic materials, which machine is compact, inexpensive to manufacture, readily transportable, and readily adaptable to be used with different sizes of bottles.

These and other objects will be appreciated when the following detailed description of the invention is considered in connection with the attendant drawings, in which like numerals designate like parts.

DETAILED DESCRIPTION OF THE DRAWINGS

Figure 2:
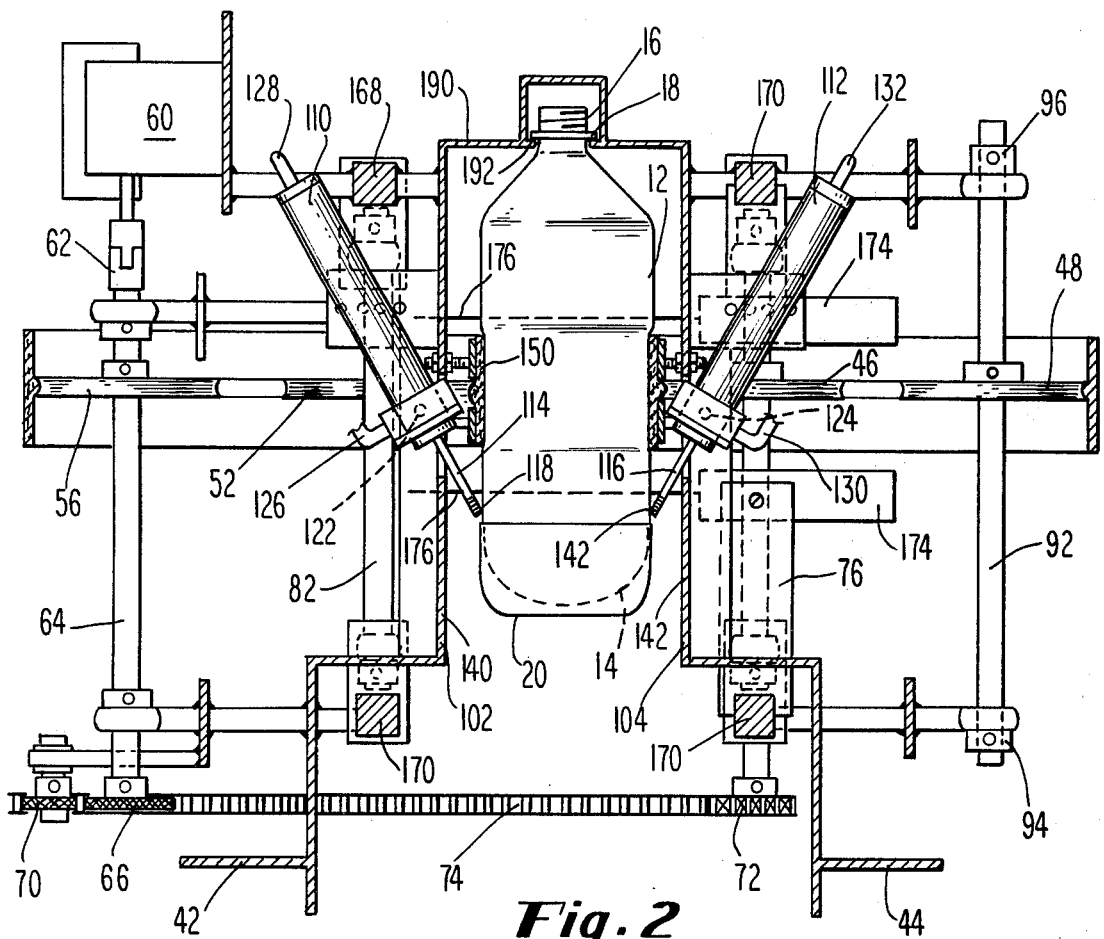
FIG. 2 is a vertical cross-sectional view, taken along line 2—2 of FIG. 1.
Figure 3:
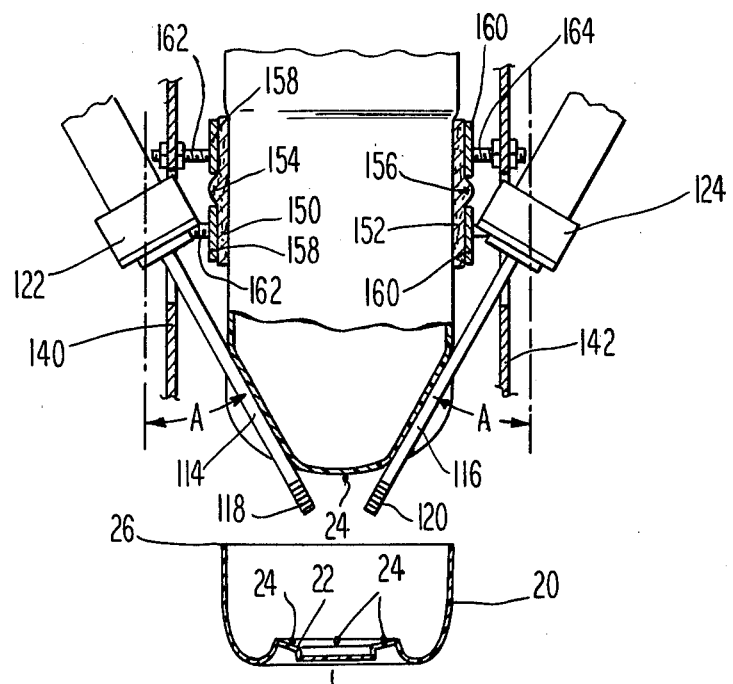
FIG. 3 is a partial cross-sectional view of the central portion of FIG. 2, with the base cup separating fingers in their downwardmost position, and with the base cup separated.

Viewing FIG. 2, the bottle 10, on which the process and apparatus of the invention operate, is seen to comprise a vertical sidewall 12, as rounded base 14, a neck 16, an enlarged flange 18 at the base of the neck, and a base cup 20. As seen in FIG. 3, the base cup 20 is formed with a raised section 22. Spaced around the periphery of raised section 22 are glue spots 24, three of which are shown. Typically, four glue spots are provided for the lip 22 of each base cup, and they are located 90° apart. When the bottle is formed, the base 14 of the bottle 10 is adhered to the base cup 20 by the four glue spots 24. The purpose of the base cup 20 is to provide a flat bottom for the bottle, to provide with stability in handling, storage and use.

Typically, but not necessarily, the bottle 12 is made of polyester resin, and the base cup 20 is made of a polyethylene or polypropylene resin. The glue spots 24 are a hot melt glue which is typically applied at a temperature of 350° Fahrenheit. Because of the structure of the bottle, approximately 80% of the material in the bottle is in the upper 25% of the bottle's height.

Figure 4:
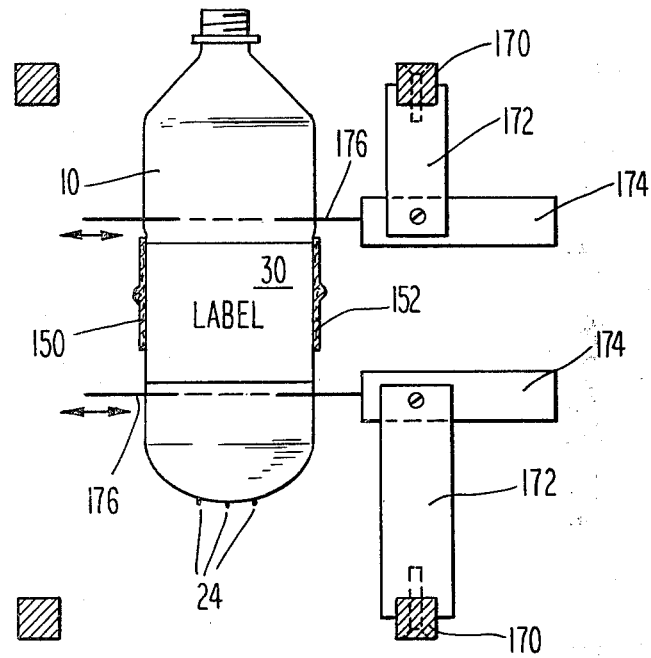
FIG. 4 is a partial cross-sectional view taken along line 4—4 or FIG. 1.

A label 30 is usually applied around the sides of the bottle, as seen in FIG. 4, typically by the use of a hot melt adhesive (not shown).

In the manufacture and use of plastic bottles, bottles may be rejected for any number of reasons. Some of these are:

(1) The bottle, when checked with a leak detector, is determined to have a leak.

(2) The label was not applied or was improperly applied.

(3) The neck of the bottle was not properly formed.

(4) The bottle is mounted in the base cup at a crooked angle.

If it has been determined, either automatically or by an operator, that any bottle does not meet the necessary specifications, that bottle is rejected, and the rejected bottles are collected in bins for later handling.

The machine of this invention is designed to operate on the rejected bottles collected in such bins, to remove the base cup from the bottle, collecting the base cups in a suitable receptacle below the machine (not shown), severing the bottle into sections before it leaves the machine, using suitable cutting means so that the bottle is severed into sections having different types or qualities of resins which may be sent to different places for recycling and reuse. For example, the plastic which is still pure and is uncontaminated with glue or label material may be melted and used as feed stock for the manufacture of new blowmolded bottles. That part of the bottle which is contaminated with a label or with glue is typically sent to a scrap dealer for reuse for other purposes.

The recycled base cups 20 may be used as regrind in making new base cups.

Figure 5:
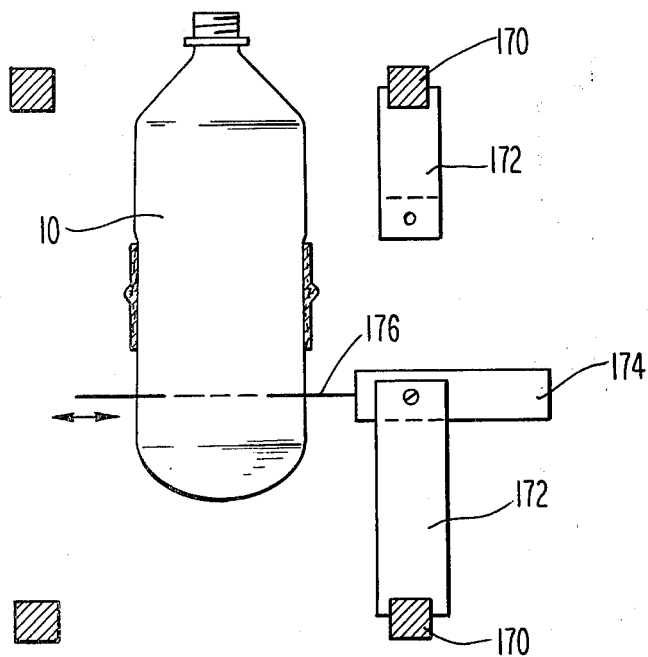
FIG. 5 is a view similar to FIG. 4, showing the location of the cutting knife for a bottle which does not have a label.

The machine of this invention generally comprises two conveyor belts, each having an opposing vertically extending land substantially parallel to the other, between which the bottles are fed by the movement of the conveyor belts, through the use of suitable drives and pulleys. The conveyor belts transport the bottles through the machine, hold the bottles in the machine while the base cups are being removed and feed the bottles to the exit end of the machine and through any suitable cutting means as shown in FIGS. 4 and 5. The conveyors constitute an important element of the invention, because they are able, when properly adjusted, to support and feed the bottle, to avoid crushing the bottle and yet provide the friction engagement of the bottle when in the position shown in FIGS. 2 and 3, to hold the bottle firmly against the downward force of the fingers 114 and 116 as they separate the base cup 20 from the bottle 14 between the position of FIG. 2 and the position of FIG. 3.

The other important element of the invention is the fingers 114 and 116, which are able, under pneumatic (or other) action, to be displaced downwardly at opposite sides of the bottle 10, to shear the base cup 20 at its glue spots 24, so that the base cup is easily separated from the base of bottle 10 and may drop into a suitable collection vessel (not shown) beneath the machine for recycling purposes. The fingers 114 and 116 are actuated by pneumatic cylinders 110 and 112. The fingers are mounted to the pistons (not shown) in the cylinders which are operated by air supplied at a pressure of from about 40 to about 100 p.s.i. via input and output lines 126 and 128 for cylinder 110 and lines 130 and 132 for cylinder 112. The pneumatic cylinders are rotatably and vertically mounted in sleeves, respectively designated 122 and 124, which are slidably and rotatably mounted to suitable members of the machine frame (not shown), so that the cylinders 110 and 112 may be elevated, lowered, moved in or out, and/or rotated, depending upon the size and shape of the bottle 10. In a preferred embodiment of the invention, the cylinders have a bore of one inch, a stroke of four inches and are operated by air at a pressure of about 100 p.s.i.

The machine is designed to be adjustable, so that it will accommodate bottles of slightly different sizes and shapes and of extremely different sizes and shapes. For example, the machine is designed to accommodate one-half liter bottles as well as one and two liter bottles and can easily be adjusted to accommodate bottles of others sizes as well.

The lower end of each of the fingers, respectively 114 and 116, is threaded as indicated by numbers 118 and 120. However, it is preferred that the ends of the fingers be smooth, so as to slide easily along the bottle-base cup interface in order to be better able to engage the base during the operative portion of the cycle.

Figure 1:
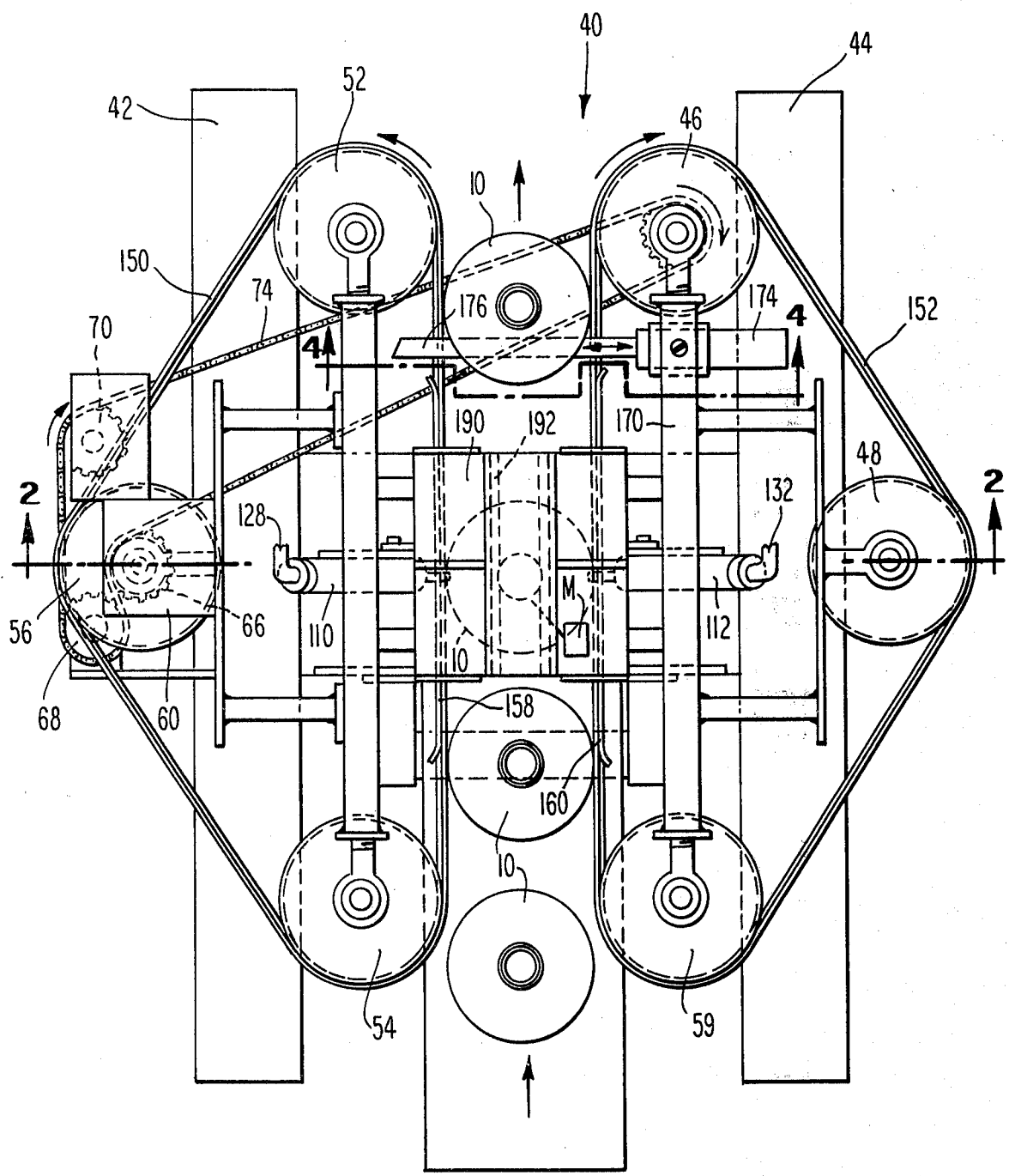
FIG. 1 is a top plan view, schematically representing the basic elements of the machine of this invention with a plurality of bottles passing therethrough.

As seen in FIG. 1, the conveyor system of the machine comprises two three-pulley-mounted sets of conveyor belts. The pulleys are respectively designated 52, 54 and 56 on the left-hand side (viewing FIGS. 1 and 2) and 46, 48 and 50 on the other side. The six pulleys are mounted to be coplanar in a horizontal plane and are driven by a suitable drive motor 60, which is desirably a small variable speed AC drive motor of one-fifteenth horsepower size. Drive motor 60 is suitably mounted to the machine frame.

The motor is driven to provide a conveyor speed of approximately thirty six feet per minute at the parallel lands.

The respective shafts on which the pulleys are mounted, 64 and 82, and 92 and 76, seen in FIG. 2, are suitably rotatably mounted to the machine frame as illustrated. Drive motor 60 drives shaft 64 which, in turn, drives pulley 56, which is the drive pulley of the set of pulleys 52, 54, and 56, so that the pulleys are driven in the counter-clockwise direction as seen in FIG. 1. The base of drive shaft 60 has a spur gear 66 mounted thereon, and spur gear 66 has idler gears 68 and 70 adjustably and rotably mounted on the machine frame (not shown) proximate thereto. Ratchet chain 74 is driven by pulleys 66, 68 and 70 and is an endless chain which also engages spur gear 72, which is mounted on the bottom of drive shaft 76 on which pulley 46 is mounted, so that shaft 76 rotates pulley 46 in a clockwise direction and pulley 46 drives the conveyor belt 152.

Pulley 56 drives conveyor belt 150, which is driven counter-clockwise over pulleys 52, 54 and 56. On the inner section of the machine, where the bottles 10 are fed, the conveyor belts 150 and 152 travel in the same direction and at the same speed in spaced, substantially parallel relation on either side of the bottles 10. A pair of spaced metal guides 158 are adjustably mounted, on screw-adjustable means 162, to the machine frame 140, as best seen in FIG. 3. On the other side of the machine, guides 160 for conveyor belt 162 are similarly adjustably mounted to the frame 142 by a screw-adjustable means 164. The mountings and adjustable means are schematically illustrated and it will be appreciated by the skilled artisan that there are various ways for mounting and adjusting these guide members 158 and 160. The purpose of the guide members is to provide a pair of parallel surfaces over which the conveyor belts 150 and 152 can travel as they feed the bottles 10 and hold the bottles 10 in position to oppose the downward forces of fingers 114 and 116 during the operative portion of the machine operating cycle when the base cup 20 is removed from the bottle 10. Each of the conveyor belts is formed with a v-shaped surface on its inner face, respectively designated 154 and 156, and these surfaces seat in the mating surfaces of the respective pulleys, 52, 54 and 56, in one case, and 46, 48 and 50 in the other case, to assure positive drive of the conveyor.

Each conveyor belt is desirably made of a two-and-one-half inch strip of pure gum rubber, but other sizes, shapes and materials are usable in this invention. The size, shape and material of the conveyor are important and should be carefully selected in order to assure a satisfactory drive of the conveyor belts and a firm, positive grip by the opposing conveyor belts on the bottle when the fingers 114 and 116 are operating to remove the base cup 20. The guides 158 and 160 are easily adjustable, so that they may be adjusted speedily to accommodate different sizes of bottles.

The machine frame has formed therein a guide section 190 which has inwardly extending flanges 192 which support and guide the bottle flanges 18. The purpose of this guide section is to keep the bottles 10 vertically aligned during the base-removal step, and they do not contribute significantly to restraining the bottle against displacement when the base sections are removed.

The cylinders 110 and 112 are standard pneumatic cylinders, but hydraulic cylinders or mechanical linkages can also be used to accomplish the same result. The essential aspect of the invention, insofar as the fingers 114 and 116 is concerned, is the angle of mounting and the position of mounting of the fingers. As exaggeratedly seen in FIG. 2, each of the fingers is mounted at an angle A from about 25° to about 30° upward from the vertical, and this angle A is important for the operation of the invention for a one liter bottle, the optimum angle A being about 30° upward from the vertical. The sleeves 122 and 124 which mount the pneumatic cylinders 110 are schematically illustrated to be rotatably mounted and also are movable up and down and in and out to allow adjustment of the position and angle of the pneumatic cylinders to accommodate different sizes and shapes of bottles.

The cylinders 110 and 112 are mounted so that the bottom of the fingers 118 are initially in the position shown in FIG. 2 where they are just above the upper edge of the base cup 20. As the bottles are fed through the machine and get to the central position shown in FIG. 1, the pneumatic cylinders 110 and 112 are actuated by the displacement of microswitch M, mounted on the machine frame in the bottle path, and fingers 114 and 116 then move downwardly in unison, each moving about four inches, the stroke of the pneumatic cylinders, slightly deforming the sides of the bottom section of bottle 10 and provided a downward displacement force against the base cup 22, to shear the glue spots 24 which adhere the base cup and the bottom 14 of bottle 10. Surprisingly, notwithstanding the numerous unsuccessful efforts which have been made to develop base cup removal machines, the use of the conveyor belt described herein and the pneumatically or similarly actuated fingers will provide extremely efficient and effective base cup removal at a high feed rate without substantially permanently deforming the bottles. The bottles may be fed through the machine at the rate of, for example, sixty bottles per minute, so that the fingers 114 and 116 are going through a displacement and retraction cycle every second.

The timing and switches for operating the machine are coordinated to provide the desired interrelationship of movement between machine-feed and finger cycle operation and also cutter cycle operation. These features can easily be developed by a skilled artisan.

When the base cups 20 are separated from the base of the bottle 10, as shown in FIG. 3, they simply drop into a suitable container (not shown) located below the machine.

After the bottles (devoid of the base cups) have passed through the base cup removal section of the machine, and while they are still being positively being driven by the conveyor belts 150 and 152, they may optionally enter a cutting section. The cutters comprise two sets of horizontally extending cutters, which may be band saws or other means, which are vertically adjustably mounted to the machine by mounting plates 172, which are mounted to the machine by mounting brackets 170. Part 174 is schematically illustrated as a support member for a suitable cutter 176, which may be a mechanical cutter, such as a band saw or a reciprocating saw, or which may be a hot wire, whichever is preferred.

The cutting means are vertically adjustable (not shown), so that the position of the cutting means can vary. For example, if a label is on the bottle, as shown in FIG. 4, the bottle has sections of three different economic values. The section above the label is virgin plastic, and this can be kept by the bottle manufacturer and reground for reuse. The section containing the label 30, between the cutters 176 in FIG. 4, contains resin contaminated by the label and the label adhesive, and this section is separately collected and sold as one type of scrap. The bottom section below the label and containing the glue spots 24 is also contaminated material, and this is separately sold to a scrap dealer.

If the label has not been applied, as when the bottle has been found defective when it is tested for leakage before application of the label, the entire bottle above the base cup glue application section is virgin material and may be reground for making other bottles. In that instance, only one cutter 176 is necessary, and that cutter blade 176 is mounted lower along the height of the bottle, so that only a small base portion, containing the glue spots, is cut out for sale to a recycle dealer. In the example of FIG. 5, all of the material above the cutter blade 176 is capable of being recycled to make beverage bottles.

It will therefore be seen that the significant elements of the apparatus of the invention constitute parallel opposed conveyor means mounted on either side of the bottle to feed the bottle and to frictionally engage the bottle, without significantly deforming the bottle, so that the bottle is held in place against the shearing movement of the fingers 114 and 116 as they deform the bottle and shear off the base cup 20. Although the bottle is slightly deformed by the conveyor surfaces 150 and 152 and by the fingers 114 and 116, the bottle has some resilience and is substantially undeformed when it enters the optional cutting section so that it can easily be cut and is substantially undeformed as it exits the machine, having been cut into sections.

In the practice of the invention, it is essential that the fingers be mounted in opposition to each other, at angles of about 25° to about 30° upward from the vertical and engaging the base cup slightly above its upper edge. More than two fingers may be used, although the fingers should be in multiples of two to avoid opposing forces which are not balanced. It is to be noted that, for different sizes and shapes of bottles, different angles A and cylinder strokes might be appropriate. However, for conventional straight-sided one- or two-liter bottle, an angle A of from about 25° to about 30° is necessary. A larger angle will damage the bottle and a smaller angle will cause the fingers to slide along the outside of the base cup.

The process of the invention is a process for removing a base cup from a plastic bottle comprising the steps of frictionally engaging the bottle approximately at its midpoint on opposite sides while engaging the interface between the base cup and the bottle by opposing downwardly extending fingers mounted at angles of about 25° to about 30° upward from the verrtical and extending the fingers downwardly to shear the base cup from the bottle. Optionally, the process includes continuing to move the bottle forward in a substantially undeformed form against the action of cutting means which are adjustable to cut the bottle into various sizes of sections for reclamation of the scrap material of the bottle.

Having thus described my invention, it will be apparent that substantial departures from the embodiment illustrated can be made without departing from the spirit or scope of the invention. For example, the fingers 114 and 116 can be hydraulically, pneumatically, or mechanically actuated. Further, two, four, or more pairs of fingers may be used so long as they provide a balance of forces and do not tend to displace the bottle out of the conveyor means.

Having thus described my invention, what is claimed is:

1. An apparatus for removing base cups from plastic bottles comprising:
   (a) A main frame;
   (b) Conveyor means having opposed parallel faces and adapted frictionally to engage, hold and drive the vertical sides of a bottle without substantial distortion;
   (c) Means mounting said conveyor means to said main frame;
   (d) Opposing finger means to engage the walls of the bottle at an angle from the vertical above its interface with a base cup to remove the base cup from the bottle without damaging or substantially deforming said bottle; and
   (e) Means mounted on said frame to displace said finger means downward and shear said base cup when said bottle is engaged by said conveyor means.

2. Apparatus as set forth in claim 1, including:
   (a) Said conveyor means extending beyond said means (d); and
   (b) Cutting means extending across the path of movement of said bottle through said conveyor means, whereby the movement of the bottle by said conveyor means against the cutting means causes said bottle to be cut into two or more sections.

3. Apparatus as set forth in claim 1, wherein said cutting means are vertically adjustable.

4. Apparatus as set forth in claim 1, wherein said angle is in the range from about 25° to about 30° when measured up from the vertical.

5. Apparatus as set forth in claim 1, wherein said conveyor means comprises two endless belts having substantially parallel lands proximate said means (d) and (e).

6. Apparatus as set forth in claim 5, wherein said conveyor belt has an outer surface of gum rubber.

7. Apparatus as set forth in claim 1, wherein said means (b) and (e) are adjustable to accommodate various sizes of bottles.

8. Apparatus as set forth in claim 6, wherein said conveyor belt has an inner surface with a centrally located substantially V-shaped protuberance coextensive therewith, to assure positive drive of said belts.

9. A process for the removal of a base cup from a plastic bottle, comprising the steps of:
   (a) Conveying said bottle between substantially parallel lands of conveyor means frictionally engaging the sides of said bottle; and
   (b) Contemporaneously removing said base cup by deforming said bottle slightly above said base cup with mechanical depending fingers located at an angle of about 25° to about 30° upward from the vertical and lowering said fingers to force said base cup axially away from said bottle until said base cup is sheared from said bottle.

10. A process as set forth in claim 9, including the additional step of conveying said bottle, after said base cup has been removed, against the cutting action of at least one blade to cut said bottle into at least two sections.

* * * * *